United States Patent [19]

Abraham et al.

[11] Patent Number: 4,895,220
[45] Date of Patent: Jan. 23, 1990

[54] METHOD FOR MONITORING OIL FLOW IN AN OIL-LUBRICATED VACUUM PUMP

[75] Inventors: Jean-Luc Abraham, Bourg les Valence; Jean-Luc Chavand, Granges les Valence; Frederic Jeziorowski, Valence, all of France

[73] Assignee: Leybold Aktiengesellschaft, Hanau am Main, Fed. Rep. of Germany

[21] Appl. No.: 235,377

[22] Filed: Aug. 23, 1988

[30] Foreign Application Priority Data

Jun. 1, 1988 [EP] European Pat. Off. ......... 88108768.8

[51] Int. Cl.⁴ ............................................. F01M 11/10
[52] U.S. Cl. .................................... 184/6.4; 184/6.22; 184/6.24; 116/DIG. 42; 210/85
[58] Field of Search ...................... 184/6.22, 6.24, 6.4, 184/108; 210/85; 116/DIG. 42

[56] References Cited

U.S. PATENT DOCUMENTS 3,073,451  1/1963  Stephenson ............................ 210/85
4,306,966 12/1981  Lucia .................................... 210/85

FOREIGN PATENT DOCUMENTS 65495  4/1982  Japan .................................... 184/6.4

Primary Examiner—Leonard E. Smith
Attorney, Agent, or Firm—Felfe & Lynch

[57] ABSTRACT

The temperature of the oil or the temperature of the cooling medium at the inlet side and at the outlet side of the oil cooler is measured and the two temperature values are compared to each other and, in the event the temperatures exceed or fall below the pre-set temperature difference, a warning signal is actuated.

7 Claims, 2 Drawing Sheets

METHOD FOR MONITORING OIL FLOW IN AN OIL-LUBRICATED VACUUM PUMP

BACKGROUND OF THE INVENTION

1. Field of the Invention

The invention relates to a method for monitoring of the amount of oil flowing in an oil circulation system of an oil lubricated vacuum pump, having an oil filter and an oil cooler, wherein the oil cooler is a heat exchanger having the oil and a cooling fluid flowing through it. The invention also relates to an oil-lubricated vacuum pump for operation in accordance with this method.

2. Discussion of Related Art

In general oil lubricated vacuum pumps, such as vane-type rotary pumps, rotary plunger vacuum pumps, have an oil filter in the oil circulation system. Among other things this filter removes from the oil all solid particles which can impair the functioning of the pump so that, in time, the filter becomes plugged with the solid particles and the amount of oil flowing through the filter decreases. If the filter is not replaced, the amount of oil passing through the filter can gradually be reduced until the oil no longer functions properly to cool, seal and lubricate the pump. This condition risks overheating the pump and scoring the piston. The present invention relates to the problem of providing a control system for determining when to replace the oil filter.

An attempt has been made to determine whether or not sufficient oil is circulating in an oil lubricated vacuum pump solely by the temperature of the oil. However, solely temperature-based control has proven to be insufficient, since the temperature of the oil is also affected by suction pressure, the temperature of the environment and the temperature of the pumped medium. Therefore no exact determination of the amount of oil flowing in the oil circulating system can be based solely on the temperature of the oil.

An attempt has also been made to use the difference in the pressure in front and behind the oil filter, but this pressure difference also depends on suction pressure, especially in the case of vacuum pumps having no oil feed pump. Thus, merely determining the pressure difference does not provide a determination of the amount of oil flowing through the filter. Moreover, this measurement does not take into account the viscosity and the temperature of the oil, which are important to the determination.

SUMMARY OF THE INVENTION

It is an object of the present invention to provide a method that permits the amount of oil flowing through the oil circulation system to be determined and easily controlled.

This is accomplished in accordance with the present invention by measuring either the temperature of the oil, or the cooling medium, on the inlet side and on the outlet side of the oil cooler. The two temperatures are compared to each other and a warning signal is provided when a predetermined temperature difference is either exceeded or fallen below, respectively.

The difference between the temperature in front of and behind the oil cooler—in the oil itself or in the cooling medium—provides a clear indication of the amount of oil flowing through the oil cooler. For example, the temperature difference of the oil increases as the oil flow decreases because the amount of heat dissipated by the cooling-medium per unit of time remains substantially constant. In the contrast, the temperature difference of the cooling medium decreases as the oil flow decreases.

These measurements are independent of the suction pressure of the pump and of the viscosity of the lubricating oil. Even slow changes in these parameters do not cause any distortions of the measurement. In both instances a measurement can be made based on temperature. If the given temperature difference is reached, exceeded, or fallen below, an optical or acoustical warning signal is provided. This warns the user that an oil change is necessary.

DETAILED DESCRIPTION OF THE PREFERRED EMBODIMENTS

Figure 1:
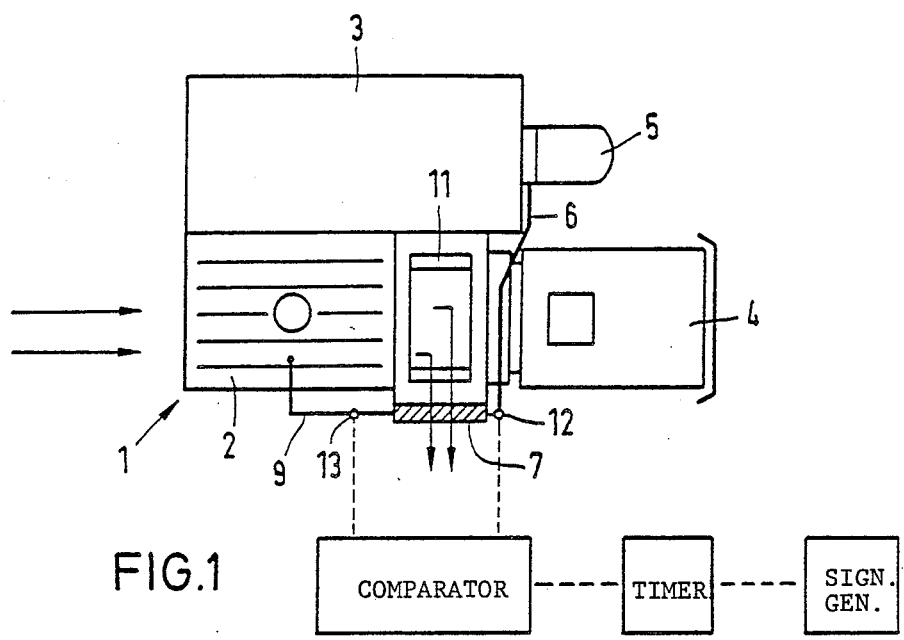
FIGS. 1 and 2 show an air-cooled oil cooler.

All the figures show a vacuum pump 1 with the pump body 2, oil tank 3 and driving motor 4. All the vacuum pumps 1 are provided with a circulation system. A component of this circulation system is the oil filter 5, which is attached to the oil tank 3. From the oil filter an oil conduit 6 leads to an oil cooler 7 in FIGS. 1 and 2, or oil cooler 8 in FIGS. 3 and 4. From the oil cooler 7 or 8, oil passes through the oil exit conduit 9 into the evacuation chamber in the pump body 2, where it acts as a coolant, sealant and lubricant for the pump. From the evacuation chamber the oil exits together with the pumped medium through the pump outlet into the oil tank 3. The vacuum pump 1 in FIG. 1 is equipped with an air-cooled oil cooler 7. This oil cooler is disposed alongside the pump body. A ventilation fan 11 draws cooling air along the pump body 2 and pushes it out radially through the oil cooler 7, which provides heat exchange between the oil and the air.

In order to measure the amount of oil flowing through the oil cooler 7, two temperature sensors 12 and 13 are provided. The first sensor 12 is disposed in the oil supply conduit 6 and the other sensor 13 in the oil exit conduit 9. Signals corresponding to the temperatures detected by the sensors 12, 13 are provided by the sensors to a comparator. The comparator produces a signal corresponding to the difference between the signals from sensors 12, 13 and transmits the signal through a timer to a warning-signal generator. The function of the timer will be explained below.

In the example of the embodiment shown in FIG. 1 the amount of heat carried off in the oil cooler 7 by the air-stream remains basically constant. For this reason the difference between the temperatures measured by the sensors 12 and 13 will increase along with a decrease in the amount of oil flowing through the oil cooler 7. When the temperature difference reaches a certain preset value, the warning signal generator produces a warning signal. This warns the user that the filter must be changed.

The temperature difference that must be preset for actuating the warning signal depends basically on the size of the vacuum pump 1. For a pump with a suction capacity of 250 m$^3$hr. and a suction pressure of 1 mbar, the oil flow amounts to about 450 liter/hr. The temperature difference measured in this flow will be 10 degrees C. If the oil flow is reduced to 200 liter/hr., the temperature difference will increase to 17 degrees C. In this operational range the pump is not in danger. There is a risk of operational trouble only when the oil flow decreases further. If the temperature difference of 17 degrees C is exceeded, the warning signal is actuated.

Figure 2:
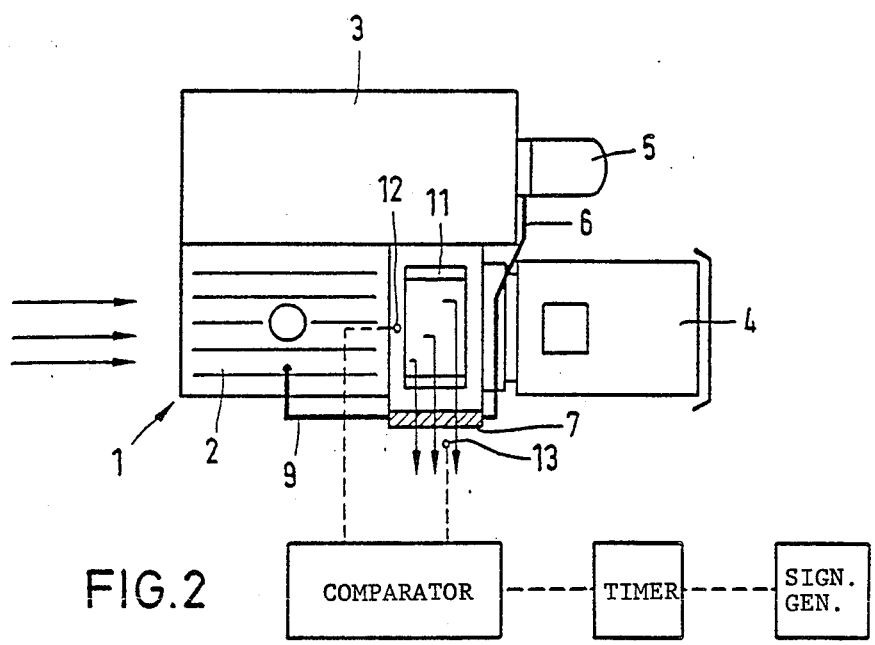

The embodiment shown in FIG. 2 differs from the embodiment shown in FIG. 1 in that the temperature sensors 12 and 13 are disposed not in the oil flow but rather in the air-flow. In an embodiment of this kind, the measured temperature difference in the cooling air will decrease along with a decrease in the amount of oil flowing through the air-cooled oil cooler 7. When the temperature difference reaches a certain pre-set minimum value, the amount of oil flowing through the air-cooled oil cooler 7 is just barely sufficient. When the temperature difference falls below the pre-set value, the warning signal generator produces the desired warning signal.

Figure 3:
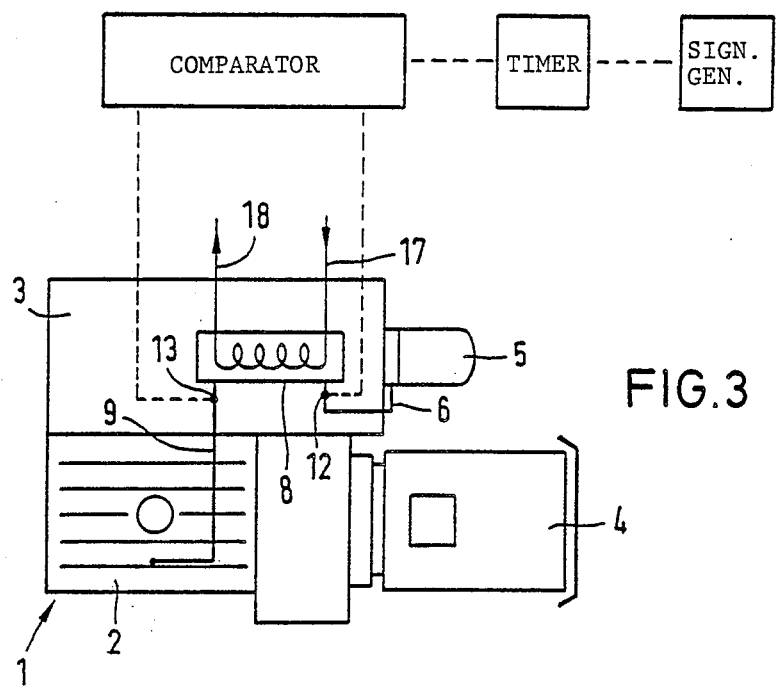
FIGS. 3 and 4 show a water-cooled oil cooler.
Figure 4:
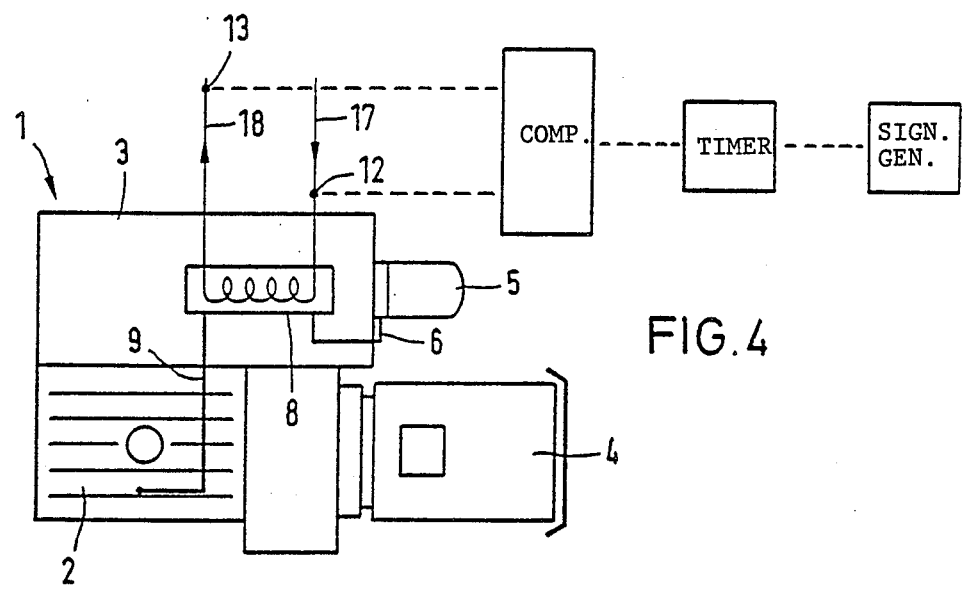

In the embodiment shown in FIGS. 3 and 4, a water-cooled oil cooler 8 is provided instead of the air-cooled oil cooler 7. The water supply conduit is indicated by reference numeral 17, and the water exit conduit by reference numeral 18.

In the embodiment shown in FIG. 3, temperature sensors 12, 13 are disposed in the oil supply conduit 6 and in the oil exit conduit 9, respectively. Here again a decrease in the amount of oil flowing through the oil cooler 8 results in an increase in the temperature difference indicated by temperature sensors 12 and 13. As described with reference to FIG. 1, the warning signal generator produces a warning signal when a pre-set limit value of the temperature difference is exceeded.

The embodiment shown in the FIG. 4 also has a water-cooled oil heat exchanger 8, as in FIG. 3. The temperature sensors 12 and 13 are disposed in the water supply conduit or in the water exit conduit.

A decrease in the amount of oil flowing through the cooler 8 produces a temperature difference decrease, just as in the case of the embodiment shown in FIG. 2. When the temperature difference falls below the preset value, the warning-signal generator produces a warning signal.

Sudden and large environmental changes may cause the measured temperature difference to move below or above the pre-set value, even though a sufficient amount of oil is flowing in the circulation system. After only a few minutes, that is, after an adaption to the modified temperature of the environment, the desired temperature conditions are restored.

In order to prevent the warning signal from being actuated, a timer is provided between the comparator and the warning signal generator. The timer determines whether the pre-set temperature value which is used for actuating the warning signal has been merely momentarily exceeded or fallen below, for a few minutes or a few seconds. If the temperature limit is violated only momentarily, the warning signal is not actuated. Only when the temperature exceeds or falls below critical limiting values for a longer period of time is the warning signal actuated.

This timer is also advantageous for normal operation. Since the filter gradually plugs up, the amount of oil flowing through the oil cooler 7, 8 gradually decreases and the amount of oil flowing through the oil cooler 7, 8 may fluctuate for a while around the lower-limit amount. If the pre-set value is only fallen below momentarily, it is not yet necessary to actuate the warning signal. This is especially true if, for reasons of safety, the temperature difference limit value is pre-set so that the amount of oil flowing when the temperature difference reaches this limit value is still completely sufficient for feeding of the vacuum pump. In such a situation a brief reduction can be permitted without causing problems. Only when the temperature limit is violated for a longer period is the warning signal actuated.

In summary, the timer prevents actuation of the warning signal by fast environmental temperature changes that occur even though a sufficient amount of oil is flowing in the oil cooler, and when the respective temperature difference values are only momentarily exceeded or fallen below.

We claim:

1. A method for monitoring of the amount of oil flowing in an oil-lubricated vacuum pump, an oil filter and an oil cooler disposed in the oil circulation system and the oil cooler being fashioned as a heat exchanger having the oil and a cooling medium flowing through it, and having a supply conduit and an exit conduit for each fluid, said method comprising the steps of:
   measuring the temperature of a fluid at the respective supply conduit and at the respective exit conduit,
   comparing the two temperature values to each other, and
   actuating a warning signal if the temperature difference reaches a pre-set value.

2. The method of claim 1, wherein the temperature of the oil in the oil supply conduit is compared to the temperature of the oil in the oil exit conduit, said warning signal being actuated if the temperature difference exceeds a pre-set value.

3. The method of claim 1, wherein the oil flowing through the oil cooler is cooled with water and the temperature of the water in the water supply conduit is compared to the temperature of the water in the water exit conduit, said warning signal being actuated if the temperature difference falls below a pre-set value.

4. The method of claim 1, wherein the oil flowing through the oil cooler is cooled with air and in that the temperature of the air after passing through the oil cooler, said warning signal being actuated if the temperature difference falls below a pre-set value.

5. The method of claim 1 further comprising the step of changing the oil filter after the warning signal is actuated.

6. An oil-lubricated vacuum pump comprising:
   an oil circulation system having an oil filter and an oil cooler disposed in that oil circulation system, the oil cooler being fashioned as a heat exchanger having oil and a cooling medium flowing through it and having a supply conduit and exit conduit for each fluid;
   temperature sensors disposed in the supply conduit and in the exit conduit of a fluid;
   a comparator adapted to determine the difference between the supply and exit temperatures; and
   a warning signal generator adapted to be actuated by said comparator.

7. The vacuum pump of claim 6 further comprising a timer adapted to control the actuation of the warning signal generator by the comparator.

* * * * *